US006773846B2

United States Patent
Chen et al.

(10) Patent No.: US 6,773,846 B2
(45) Date of Patent: Aug. 10, 2004

(54) MOBILE RACK TYPE BATTERY BOX FOR UPS SYSTEM

(75) Inventors: Jake Chen, 12F, No. 19-11, San Chung Rd., Nan Kang District, Taipei (TW); Johnny Lin, 12F, No. 19-11, San Chung Rd., Nan Kang District, Taipei (TW)

(73) Assignees: Allis Electric Co., Ltd., Taipei (TW); Jake Chen, Taipei (TW); Johnny Lin, Taipei (TW)

( * ) Notice: Subject to any disclaimer, the term of this patent is extended or adjusted under 35 U.S.C. 154(b) by 0 days.

(21) Appl. No.: 10/222,803

(22) Filed: Aug. 19, 2002

(65) Prior Publication Data

US 2004/0033415 A1 Feb. 19, 2004

(51) Int. Cl.⁷ .......................... H01M 2/10; H01M 6/46; B65D 85/00
(52) U.S. Cl. .......................... 429/97; 429/99; 429/153; 429/177; 206/703; 206/723
(58) Field of Search .......................... 429/100, 99, 97, 429/96, 151, 153, 157, 159, 163, 176, 175, 177; 206/703, 723, 722, 728, 725, 718, 702, 704, 705, 207, 320

(56) References Cited

U.S. PATENT DOCUMENTS

| | | | | |
|---|---|---|---|---|
| 3,995,008 A | * | 11/1976 | Spiegelberg | 264/328.8 |
| 6,380,713 B2 | * | 4/2002 | Namura | 320/112 |
| 6,410,185 B1 | * | 6/2002 | Takahashi et al. | 429/163 |
| 6,599,657 B1 | * | 7/2003 | Pollett et al. | 429/96 |

* cited by examiner

Primary Examiner—Raymond Alejandro
(74) Attorney, Agent, or Firm—Browdy and Neimark, P.L.L.C.

(57) ABSTRACT

A mobile rack type battery box is constructed to include two hollow rectangular cover shells symmetrically fastened together by screws, each cover shell having at least one longitudinal inside groove for receiving electric wires and ventilation, and a plurality of battery cells mounted in the holding space defined within the cover shells and horizontally abutted against one another.

7 Claims, 9 Drawing Sheets

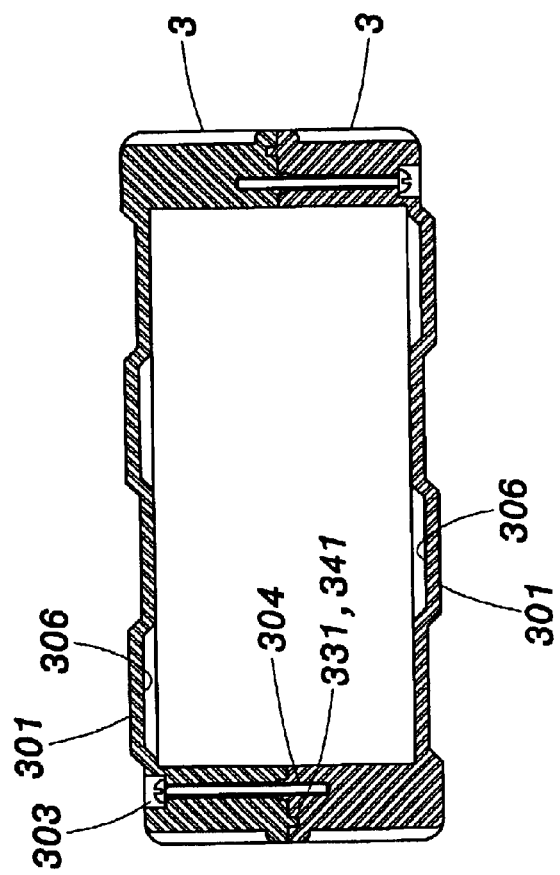
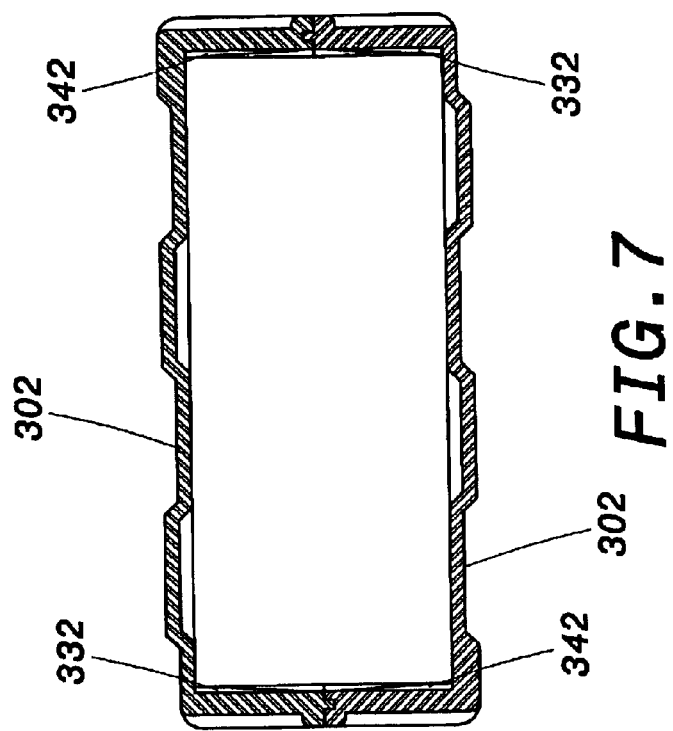
FIG. 6
FIG. 7

MOBILE RACK TYPE BATTERY BOX FOR UPS SYSTEM

BACKGROUND OF THE INVENTION

1. Field of the Invention

The present invention relates to a UPS (uninterruptible power supply) system and, more particularly, to a mobile rack type battery box for use in a UPS system.

2. Description of the Related Art

A conventional UPS (uninterruptible power supply) system, either of a small scale for computer or the like or a big scale for industrial machine or server, as shown in FIG. 1, comprises a housing 1 defining a storage chamber 11, and a plurality of battery cells 2 mounted in the storage chamber 11 and electrically connected in series. When city power supply failed, the UPS system immediately provides the necessary working voltage to the apparatus at the load, keeping normal running of the apparatus. This UPS system battery arrangement design has numerous drawbacks as outlined hereinafter.

1. When power low, the battery cells 2 must be detached from one another and disconnected from the power circuit in the UPS system.
2. Because the battery cells 2 are directly installed in the storage chamber 11 inside the housing 1 of the UPS system and not properly shield with EMI (electromagnetic interference) protective shielding means, the radiation of the storage battery 2 may interfere with normal functioning of surrounding electronic components or apparatus.
3. Because the battery cells 2 are directly installed in the storage chamber 11 inside the housing 1 of the UPS system and not properly shield, there is a risk of short circuit.
4. Because the battery cells 2 are installed in the storage chamber 11 in vertical, the height of the UPS system cannot be minimized to fit a small electric apparatus.

SUMMARY OF THE INVENTION

The present invention has been accomplished to provide a mobile rack type battery box for a UPS system, which eliminates the aforesaid drawbacks. It is therefore the main object of the present invention to provide a mobile rack type battery box, which is portable and can conveniently be installed in a UPS system. It is another object of the present invention to provide a mobile rack type battery box, which is simple and inexpensive to manufacture. It is still another object of the present invention to provide a mobile rack type battery box, which provides good ventilation. It is still another object of the present invention to provide a mobile rack type battery box, which shields the radiation of the battery cells, preventing interference with surrounding electronic devices. It is still another object of the present invention to provide a mobile rack type battery box, which keeps the electric wires of the battery cells well arranged, eliminating the risk of short circuit. It is still another object of the present invention to provide a mobile rack type battery box, which occupies less vertical installation space. It is still another object of the present invention to provide a mobile rack type battery box, which has means to hold the loaded battery cells in position. It is still another object of the present invention to provide a mobile rack type battery box, which is automatically electrically connected to the UPS system when inserted into the storage chamber of the UPS system. It is still another object of the present invention to provide a mobile rack type battery box, which has coupling means on the outside such that a number of mobile rack type battery boxes can be coupled to one another and arranged in a stack. According to one aspect of the present invention, the mobile rack type battery box comprises two symmetrical cover shells fastened together and defining a holding space, the cover shells each having a horizontal base wall, a vertical front wall, a vertical back wall, a vertical left sidewall, and a vertical right sidewall, said horizontal base wall having at least one longitudinal inside groove for receiving electric wires; and a plurality of battery cells mounted in the holding space inside the cover shells and horizontally abutted against one another. According to another aspect of the present invention, the cover shells each have an opening in the respective vertical back wall. The opening of the vertical back wall of one of the cover shells is mounted with a power output socket for output of battery power from the battery cells. The opening of the vertical back wall of the other of the cover shells is blocked with a sealing plate. According to still another aspect of the present invention, the vertical left and right sidewalls of the cover shells each have a plurality of beveled ribs disposed at an inner side and adapted for friction engagement with the battery cells to hold the battery cells inside the cover shells. According to still another aspect of the present invention, the cover shells each have longitudinal ribs and longitudinal grooves alternatively disposed in the respective horizontal base wall on the outside such that a number of mobile rack type battery boxes can be coupled to one another and arranged in a stack by engaging the longitudinal ribs of one cover shell of one mobile rack type battery box into the longitudinal grooves of one cover shell of another mobile rack type battery box.

BRIEF DESCRIPTION OF THE DRAWINGS

FIG. 6 is a sectional view of the mobile rack type battery box according to the present invention, showing the cover shells fastened together.

FIG. 7 is another sectional view of the mobile rack type battery box according to the present invention, showing the friction engagement between the beveled ribs and the battery cells.

DETAILED DESCRIPTION OF THE PREFERRED EMBODIMENT

Figure 1:
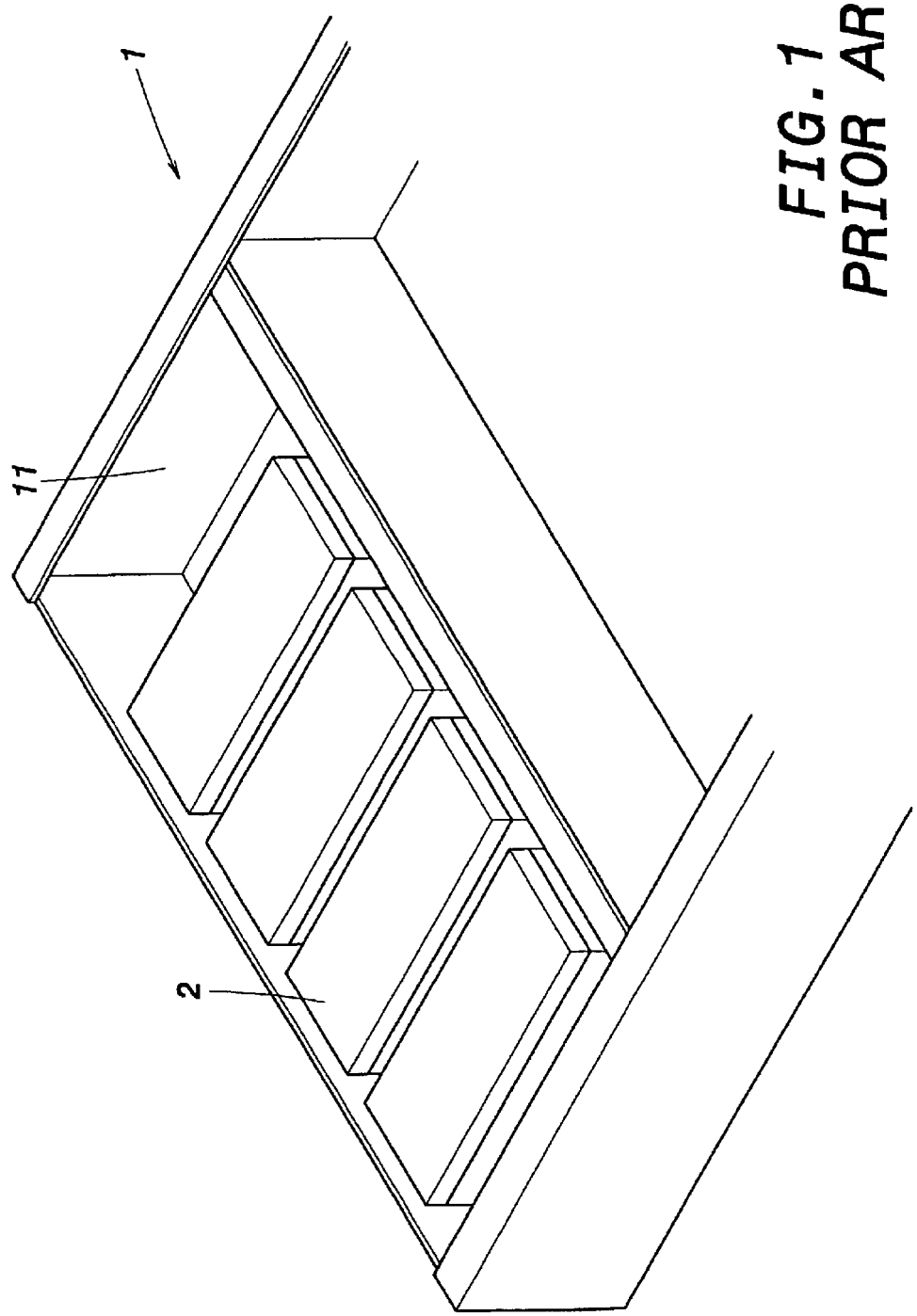
FIG. 1 illustrates the arrangement of battery cells in a UPS system according to the prior art.
Figure 2:
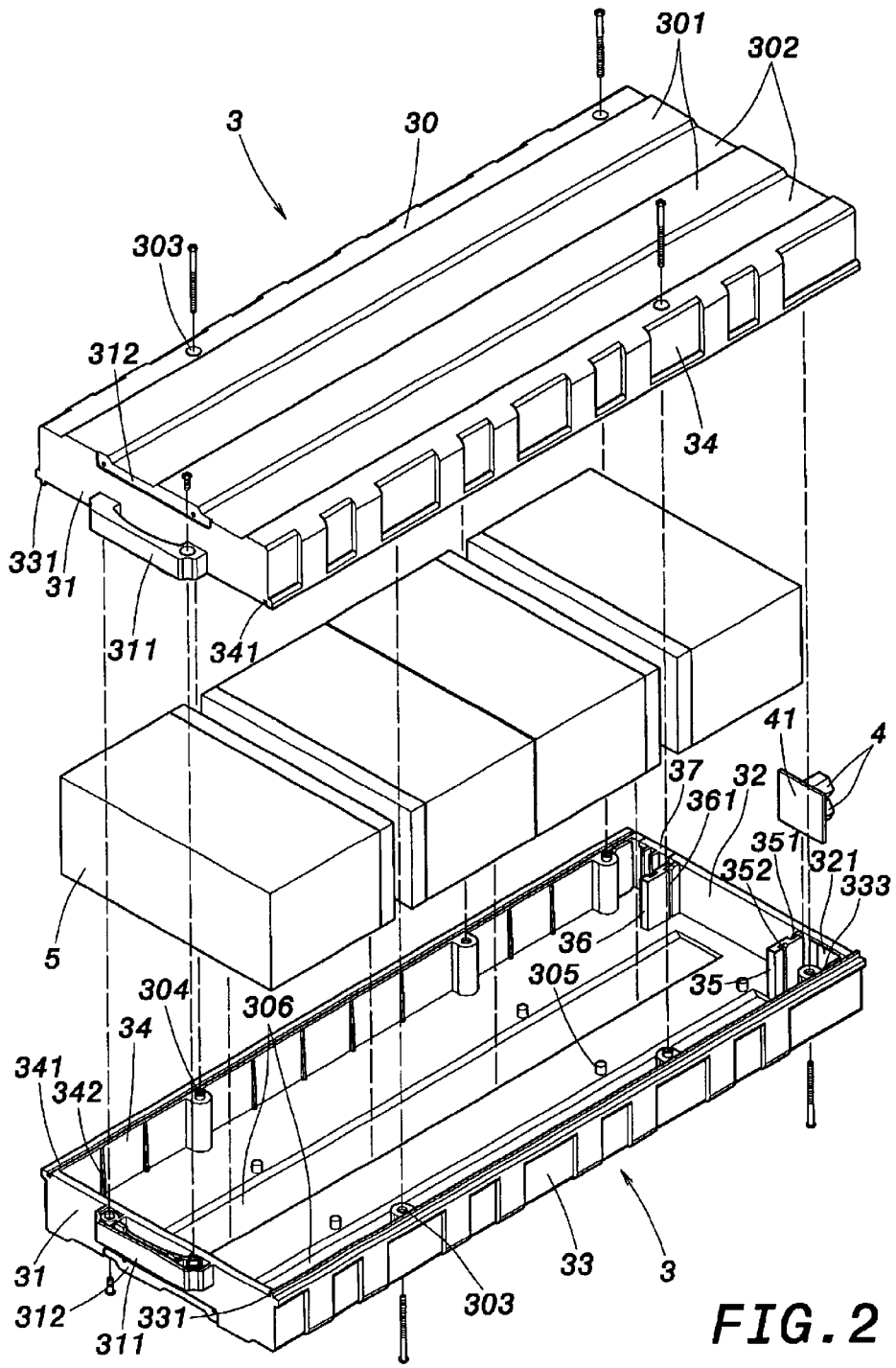
FIG. 2 is an exploded view of a mobile rack type battery box for use in a UPS system according to the present invention.
Figure 3:
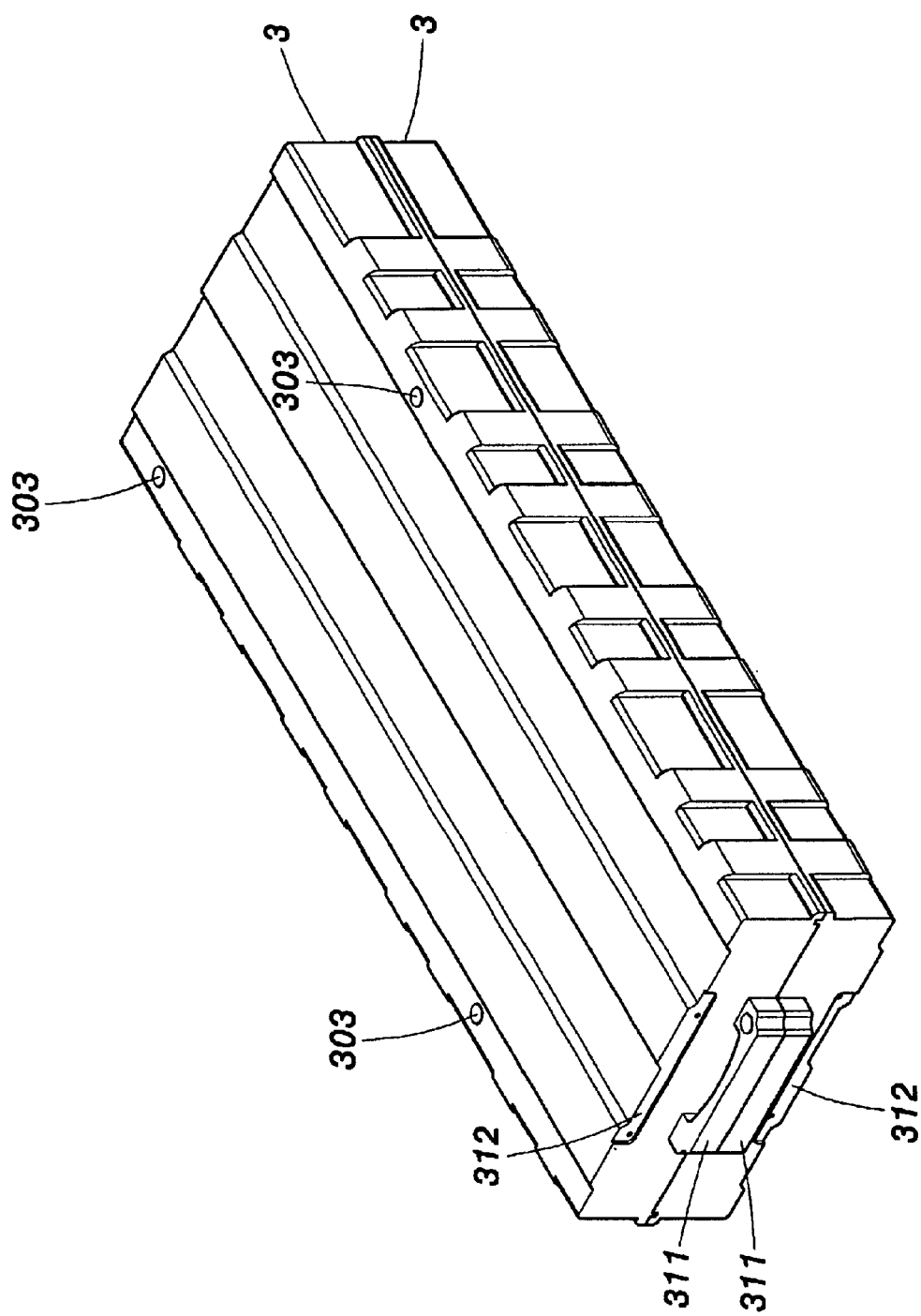
FIG. 3 is an elevational view of the mobile rack type battery box according to the present invention.
Figure 4:
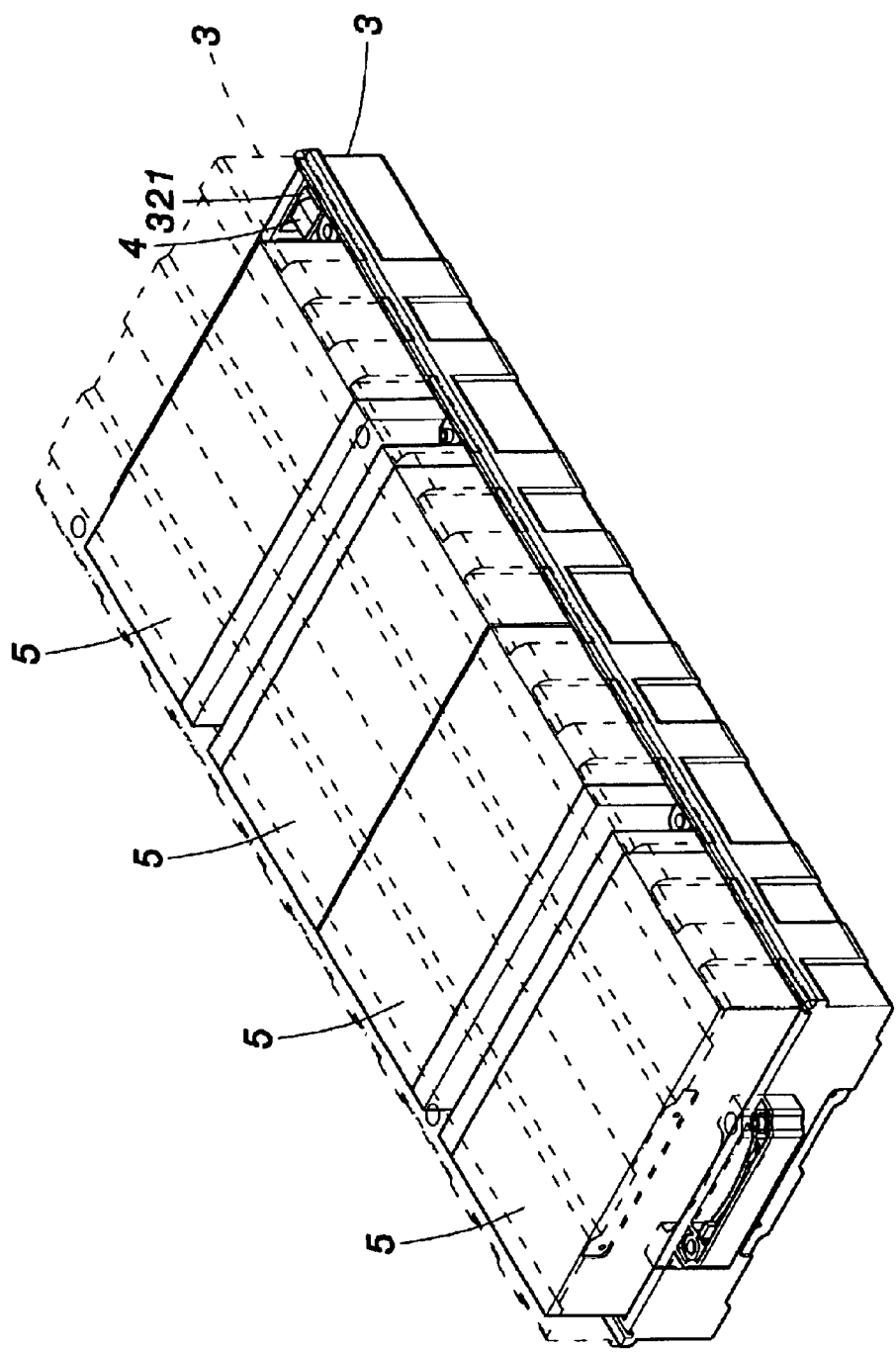
FIG. 4 is a perspective view of the mobile rack type battery box according to the present invention.

Referring to FIGS. 2 and 3, a mobile rack type battery box in accordance with the present invention is shown comprised of two symmetrical cover shells 3, and a plurality of battery cells 5 mounted in the cover shells 3 and horizontally abutted against one another. The cover shells 3 are hollow rectangular shells, each having a substantially rectangular horizontal base wall 30, a vertical front wall 31, a vertical back wall 32, a vertical left sidewall 33, and a vertical right sidewall 34.

The horizontal base wall 30 of each cover shell 3 has two longitudinal ribs 301 and two longitudinal grooves 302 alternatively arranged in parallel at the outer side, two longitudinal grooves 306 arranged in parallel at the inner side corresponding to the longitudinal ribs 301 (see also FIG. 6), a plurality of vertical through holes 303 longitudinally arranged in a line along one long side thereof, and a plurality of screw holes 304 longitudinally arranged in a line along the other long side thereof, and a plurality of upright locating rods 305 vertically disposed at the inner side and adapted for holding the battery cells 5 in position. When the cover shells 3 attached together to hold the battery cells 5 on the inside, the through holes 303 of one cover shell 3 are respectively aimed at the screw holes 304 of the other for the installation of respective screws to fixedly secure the cover shells 3 together.

The vertical front wall 31 of each cover shell 3 has a handle 311 fixedly fastened thereto on the outside, and an outside recess 312 adjacent to the horizontal base wall 30. Preferably, the handles 311 of the vertical front walls 31 of the cover shells 3 have a screw hole and a through hole so that the handles 311 of the vertical front walls 31 of the cover shells 3 can be fixedly fastened together by screws when the cover shells 3 secured together.

The vertical left sidewall 33 of each cover shell 3 has a vertical locating groove 333 disposed adjacent to the vertical back wall 32.

The vertical back wall 32 of each cover shell 3 has an opening 321 and an air filter 37 disposed near the two distal ends for circulation of air through and dissipation of heat from the inside space of the cover shells 3, first and second partition plates 35;36 vertically disposed on the inside between the opening 321 and the air filter 37, the first partition plate 35 having a first vertical locating groove 351 at one side and a second vertical locating groove 352 at the other side, the second partition plate 36 having a vertical locating groove 361 adapted for holding a main circuit board (not shown) with the first vertical locating groove 351, and a circuit board 41 mounted in the second vertical locating groove 352 of the first partition plate 35 and the vertical locating groove 333 of the vertical left sidewall 33. The circuit board 41 comprises a power output socket 4 fitted into the opening 321. Because one battery box needs only one power output socket 4, one of the cover shells 3 is mounted with the circuit 41, the other of the cover shells 3 is mounted with a sealing plate (not shown) to close the respective opening 321.

The vertical left sidewall 33 of each cover shell 3 has a longitudinal coupling flange (or longitudinal coupling groove) 331, and a plurality of beveled ribs 332 disposed on the inside and adapted for securing the battery cells 5 by friction engagement.

The vertical right sidewall 34 of each cover shell 3 has a longitudinal coupling groove (or longitudinal coupling flange) 341, and a plurality of beveled ribs 342 disposed on the inside and adapted for securing the battery cells 5 by friction engagement. When fastening the cover shells 3, the longitudinal coupling flange (or longitudinal coupling groove) 331 of one cover shell 3 is forced into engagement with the longitudinal coupling groove (or longitudinal coupling flange) 341 of the other cover shell 3.

Figure 5:
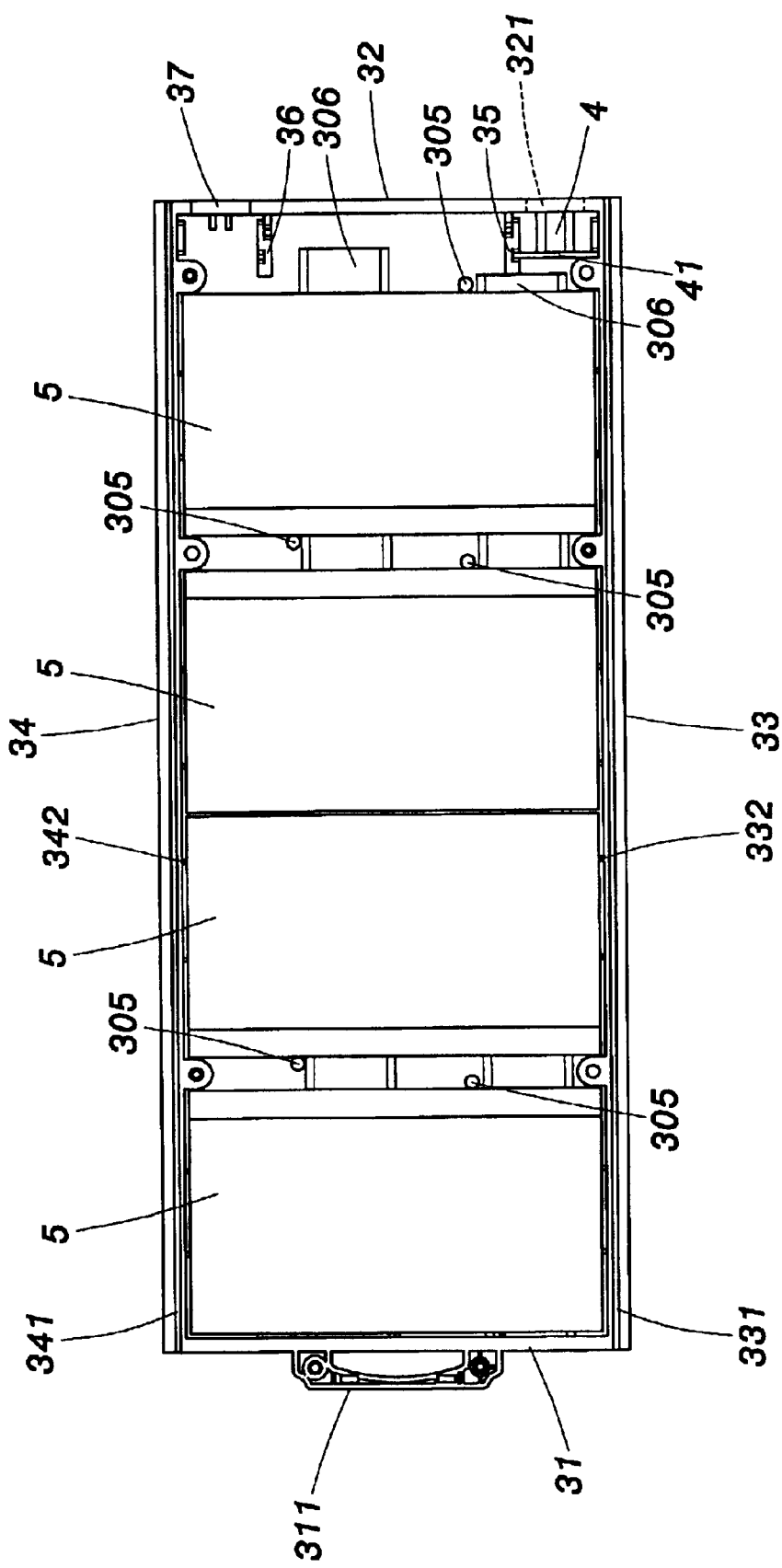
FIG. 5 is a top view of the mobile rack type battery box according to the present invention after removal of the top cover shell.

Referring to FIGS. 5~7 and FIGS. 2 and 4 again, by means of the upright locating rods 305 and the beveled ribs 332;342, the battery cells 5 are positively positioned inside the cover shells 3. Further, the longitudinal grooves 306 are provided for receiving electric wires connected to the battery cells 5 as well as for ventilation.

Figure 8:
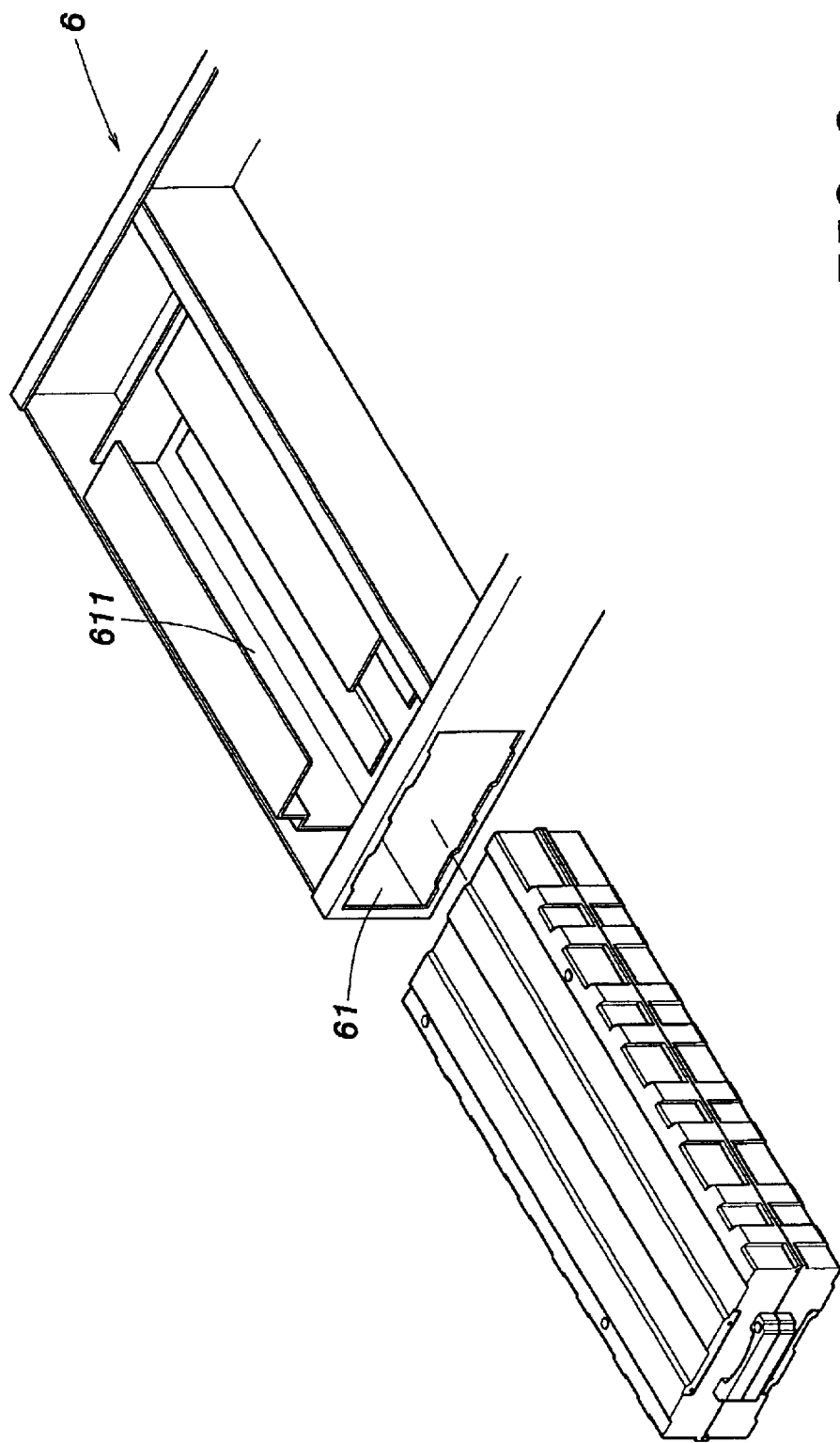
FIG. 8 illustrates the relationship between the mobile rack type battery box and the UPS system according to the present invention.
Figure 9:
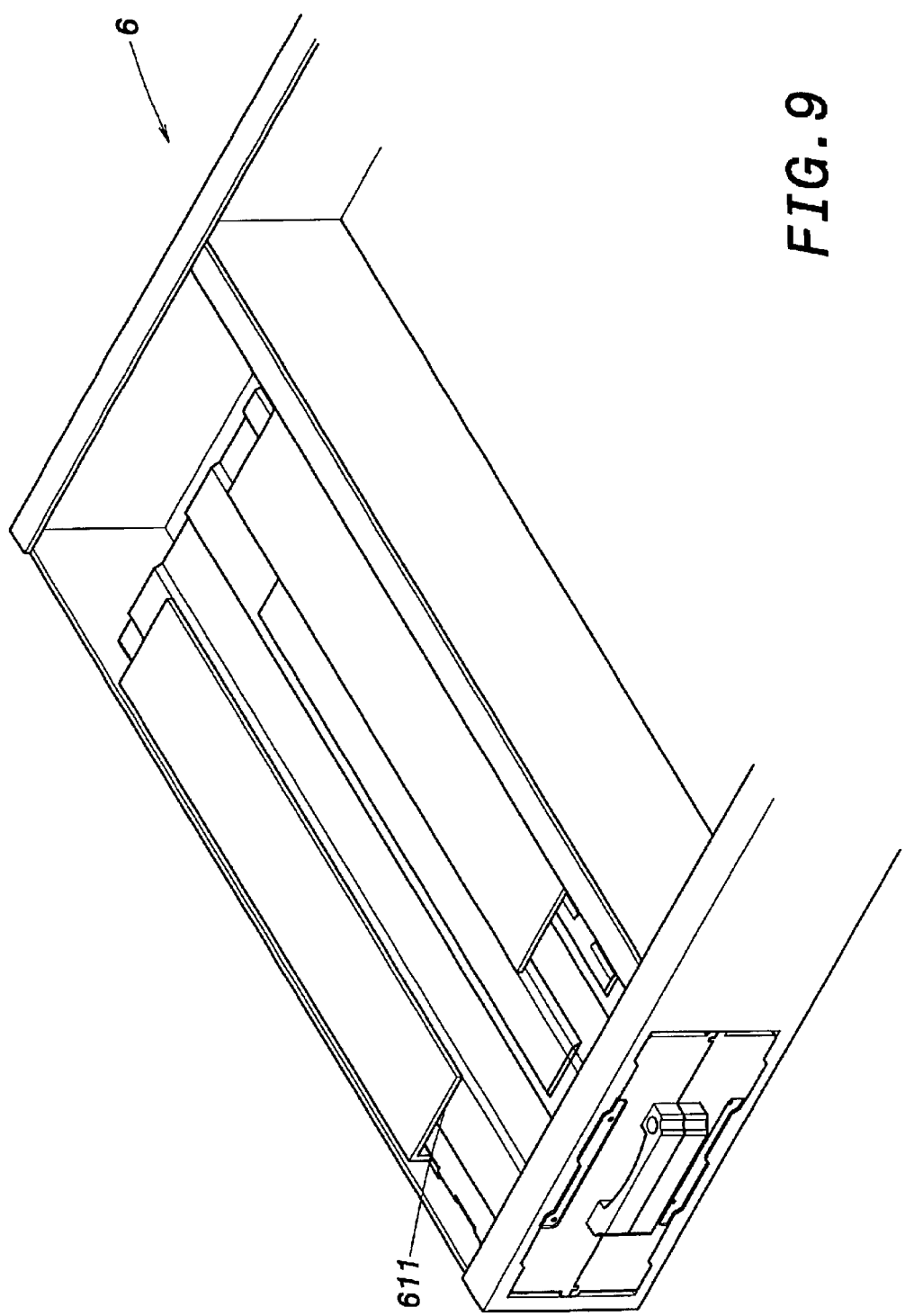
FIG. 9 is an assembly view of FIG. 8.
Figure 10:
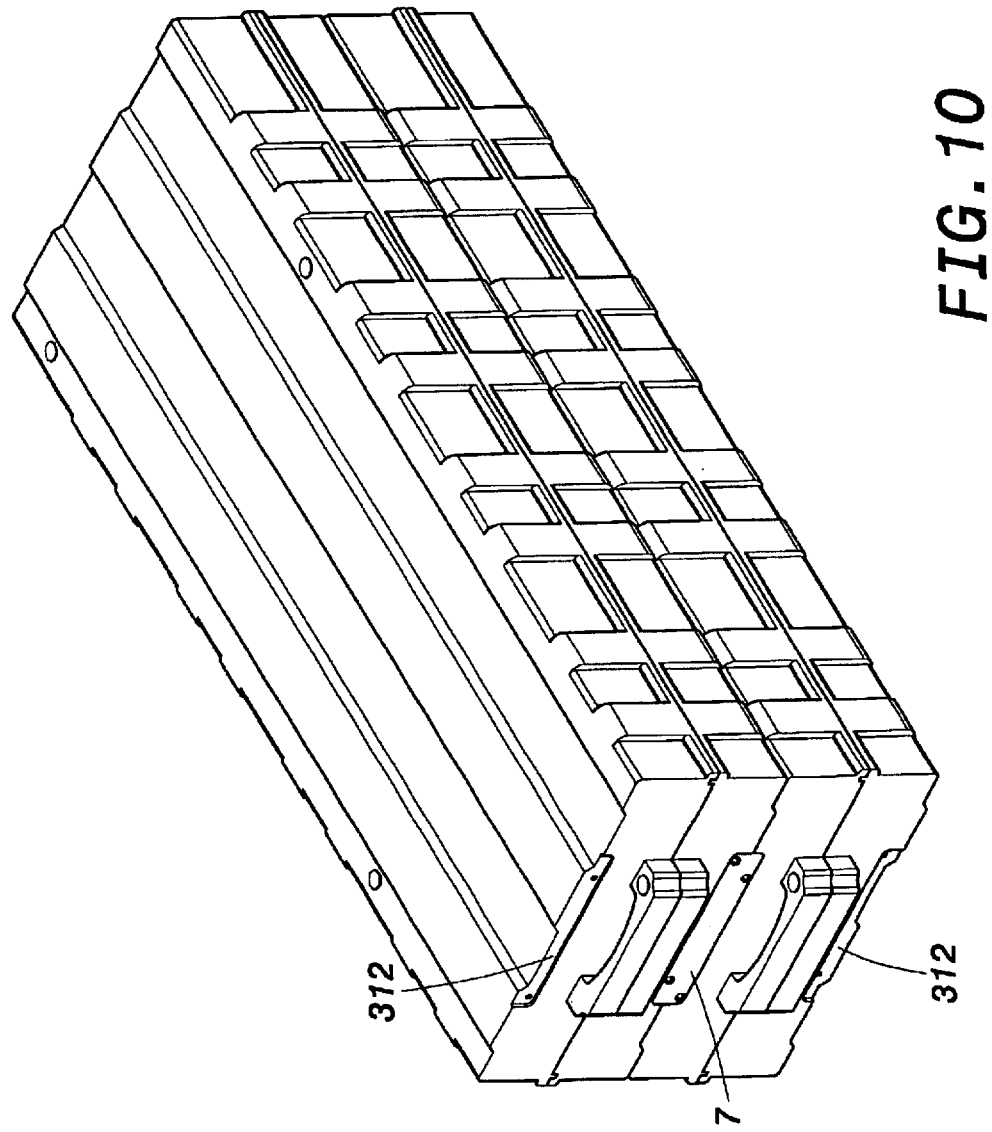
FIG. 10 illustrates a plurality of mobile rack type battery boxes arranged in a stack according to the present invention.

Referring to FIGS. 8 and 9, the housing 6 of the UPS system has a storage chamber 611 and an access hole 61 in one side thereof in communication with the storage chamber 611. The mobile rack type battery box is inserted through the access hole 61 into the inside of the storage chamber 611. When inserted into the storage chamber 611, the power output socket 4 is electrically connected to an electric plug (not shown) inside the storage chamber 611. When pulling the mobile rack type battery box out of the storage chamber 611, the power output socket 4 is disconnected from the electric plug of the UPS system.

Referring to FIG. 10 and FIGS. 5~7 again, because the battery cells 5 are horizontally abutted against one another, the mobile rack type battery box has a limited height. Therefore, several mobile rack type battery boxes can be arranged in a stack for use in a big scale UPS system. When multiple mobile rack type battery boxes arranged in a stack, the longitudinal ribs 301 of one mobile rack type battery box are forced into engagement with the longitudinal grooves 302 of another, and locating plates 7 are respectively fastened to the outside recesses 312 of each two adjacent mobile rack type battery boxes by screws to fix the mobile rack type battery boxes together.

A prototype of mobile rack type battery box has been constructed with the features of the annexed drawings of FIGS. 2~10. The mobile rack type battery box functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mobile rack battery box adapted to an uninterruptible power supply (UPS), comprising:

two symmetrical cover shells each having an identical horizontal base wall, vertical front wall, vertical back wall, vertical left sidewall and vertical right sidewall, the horizontal base wall having at least one longitudinal inside groove for receiving electric wires;

wherein the mobile rack battery box is assembled by fastening the two symmetrical cover shells together via screws with the vertical front and back walls and the vertical right and left sidewalls of one of the two cover shells respectively abutting the vertical front and back walls and the vertical right and left sidewalls of the other of the two cover shells to define a holding space for sealing a plurality of battery cells horizontally abutted against one another;

wherein said cover shells each have an opening in the respective vertical back wall; the opening of the vertical back wall of the one of the two cover shells is mounted with a power output socket for output of battery power from said battery cells; the opening of the vertical back wall of the other of the two cover shells is blocked with a sealing plate;

wherein the vertical left and right sidewalls of said cover shells each have a plurality of beveled ribs disposed at an inner side thereof for tight engagement with said battery cells to securely hold said battery cells inside said cover shells;

wherein the horizontal base wall of each of said cover shells has a plurality of longitudinal ribs and longitudinal grooves alternately arranged in parallel on the outside so that a plurality of assembled mobile rack battery boxes can be arranged in a stack by engaging the longitudinal ribs of the cover shell of one assembled mobile rack battery box into the longitudinal grooves of the cover shell of another assembled mobile rack battery box.

2. The mobile rack battery box as claimed in claim 1, wherein said cover shells each comprise two partition plates bilaterally inwardly protruded from the respective vertical back wall, said partition plates each having a vertical locating groove facing each other and adapted for holding a main circuit board inside said cover shells.

3. The mobile rack battery box as claimed in claim 2, wherein said cover shells each further comprise two vertical locating grooves respectively disposed in one of said partition plate and the respective left sidewalls for the positioning of a circuit board holding said socket and a sealing plate selectively.

4. The mobile rack battery box as claimed in claim 1, wherein the horizontal base wall of each of said cover shells has a plurality of positioning elements disposed on the inside and adapted for securing said battery cells in place.

5. The mobile rack battery box as claimed in claim 4, where said positioning elements are upright locating rods respectively upwardly protruded from an inner side of the horizontal base wall of each of said cover shells.

6. The mobile rack battery box as claimed in claim 1, wherein said cover shells each have a recess disposed in the respective vertical front sidewall for the mounting of a locating plate to secure two mobile rack type battery boxes in a stack.

7. The mobile rack battery box as claimed in claim 1, wherein said battery cells are a storage battery.

* * * * *